US006699616B2

United States Patent
Wu

(10) Patent No.: US 6,699,616 B2
(45) Date of Patent: Mar. 2, 2004

(54) BATTERY HOUSING FOR MEDICAL SCOOTER

(75) Inventor: Donald P. H. Wu, No.169, Ken Tzu Ku, Shang Ken Tsun, Hsin Feng Hsiang, Hsinchu County (TW)

(73) Assignee: Donald P. H. Wu, Hsinchu (TW)

( * ) Notice: Subject to any disclaimer, the term of this patent is extended or adjusted under 35 U.S.C. 154(b) by 329 days.

(21) Appl. No.: 09/974,110

(22) Filed: Oct. 6, 2001

(65) Prior Publication Data

US 2003/0068545 A1 Apr. 10, 2003

(51) Int. Cl.[7] .......................... H01M 2/10; H01M 6/42; H01M 2/24; B60R 16/04; B62D 61/00
(52) U.S. Cl. .......................... 429/98; 429/96; 429/100; 429/151; 429/160; 180/68.5; 180/208
(58) Field of Search .......................... 429/98, 96, 100, 429/151, 160; 180/68.5, 208

(56) References Cited

U.S. PATENT DOCUMENTS 5,036,938 A * 8/1991 Blount et al. ............... 180/208
5,197,559 A * 3/1993 Garin, III et al. .......... 180/65.1
5,522,734 A * 6/1996 Goertzen .................... 439/500

* cited by examiner

*Primary Examiner*—Patrick Ryan
*Assistant Examiner*—Julian Mercado
(74) *Attorney, Agent, or Firm*—Pro-Techtor International Services

(57) ABSTRACT

A battery housing for medical scooter includes a movable base provided with at least two battery compartments for each receiving a battery therein, an electrode contact provided at the bottom of each battery compartment to electrically connect to a positive or a negative electrode of the battery in the same compartment, and an electricity chamber for accommodating a charger and a power cord that could be easily pulled out to connect to an external AC power source for the charger to recharge the batteries. Two elastic conductive plates are provided below the battery compartments to contact with the electrode contacts, so that power could be supplied from the batteries to positive and negative power supply wires of the cart connected to the conductive plates. Drain holes are provided below the elastic conductive plates to protect the battery housing from damage due to accumulated water on the medical scooter.

11 Claims, 8 Drawing Sheets

BATTERY HOUSING FOR MEDICAL SCOOTER

FIELD OF THE INVENTION

The present invention relates to a battery housing for medical scooter, and more particularly to a battery housing that is mounted on a medical scooter to facilitate easy and safe mounting, dismounting, and recharging of batteries of the medical scooter.

BACKGROUND OF THE INVENTION

Motor vehicles, particularly cars and motorcycles, have become very important traffic means in the modern society. Since most of these motor vehicles, either cars or motorcycles, use gasoline as their fuel, is they produce the problem of air pollution. With the increasing requirement for environmental protection, environmentally friendly electric vehicles have been developed. Among various types of electric vehicles, there is an electric cart that has light weight and can be easily operated and is therefore widely welcome and employed by teenaged students, housewives, the invalid and the aged to conveniently assist them in moving usually within a short distance.

A main power source for the electric cart includes several batteries and a motor work together to drive the cart. Since batteries are the main power source of the electric cart, the manner of mounting them on the cart has very important influence on the convenient use of the electric cart. It is therefore necessary to find a way as perfect as possible for mounting the batteries on the electric cart.

FIG. 9 shows a typical electric cart of prior art that includes a main body A without any shell, and a seat Al having very simple battery brackets A2 provided below it to hold batteries B. The batteries B are directly and integrally assembled to the main body A, and it is time and labor consuming to mount or dismount the batteries B onto or from the main body A, resulting in inconveniences in recharging, maintaining or repairing the batteries B.

Another problem with the above-described manner of mounting batteries B on the main body A of the electric cart is an operator must repeatedly disconnect and connect positive and negative wires from and to the batteries B when dismounting and mounting the batteries B and such operation would inevitably have adverse influence on the usable life of the connections of the batteries B.

SUMMARY OF THE INVENTION

It is a primary object of the present invention to provide a battery housing for a medical scooter to enable easy mounting and dismounting of batteries onto and from the medical scooter without the need of consuming too much time and labor in repeatedly dismounting and assembling a body of the cart, so that batteries for the medical scooter could be conveniently removed from the cart for, for example, recharging at a garage.

Another object of the present invention is to provide a battery housing for a medical scooter to enable quick and safe separation of positive and negative wires from one another whenever the batteries are dismounted.

A further object of the present invention is to provide a battery housing for a medical scooter that is provided with means for receiving a charger and related power cords to enable convenient recharging of batteries.

To achieve the above and other objects, the battery housing for medical scooter of the present invention mainly includes a movable base detachably connected to a rear part of the medical scooter below a seat thereof. The movable base is provided with at least two battery compartments for each receiving a battery therein, an electrode contact provided at the bottom of each battery compartment to electrically connect to a positive or a negative electrode of the battery in the same compartment, and an electricity chamber for accommodating a charger and a power cord that could be easily pulled out to connect to an external AC power source for the charger to recharge the batteries. Two elastic conductive plates are mounted to the rear part of the medical scooter corresponding to the battery compartments and are separately connected at one end to positive and negative power supply wires of the cart. Another end of the elastic conductive plates are in contact with the electrode contacts, so that power could be supplied from the batteries via the electrode contacts and the elastic conductive plates to the positive and negative power supply wires for driving the medical scooter. Recesses with drain holes are provided on the medical scooter below the elastic conductive plates to protect the battery housing from damage due to accumulated water on the medical scooter.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
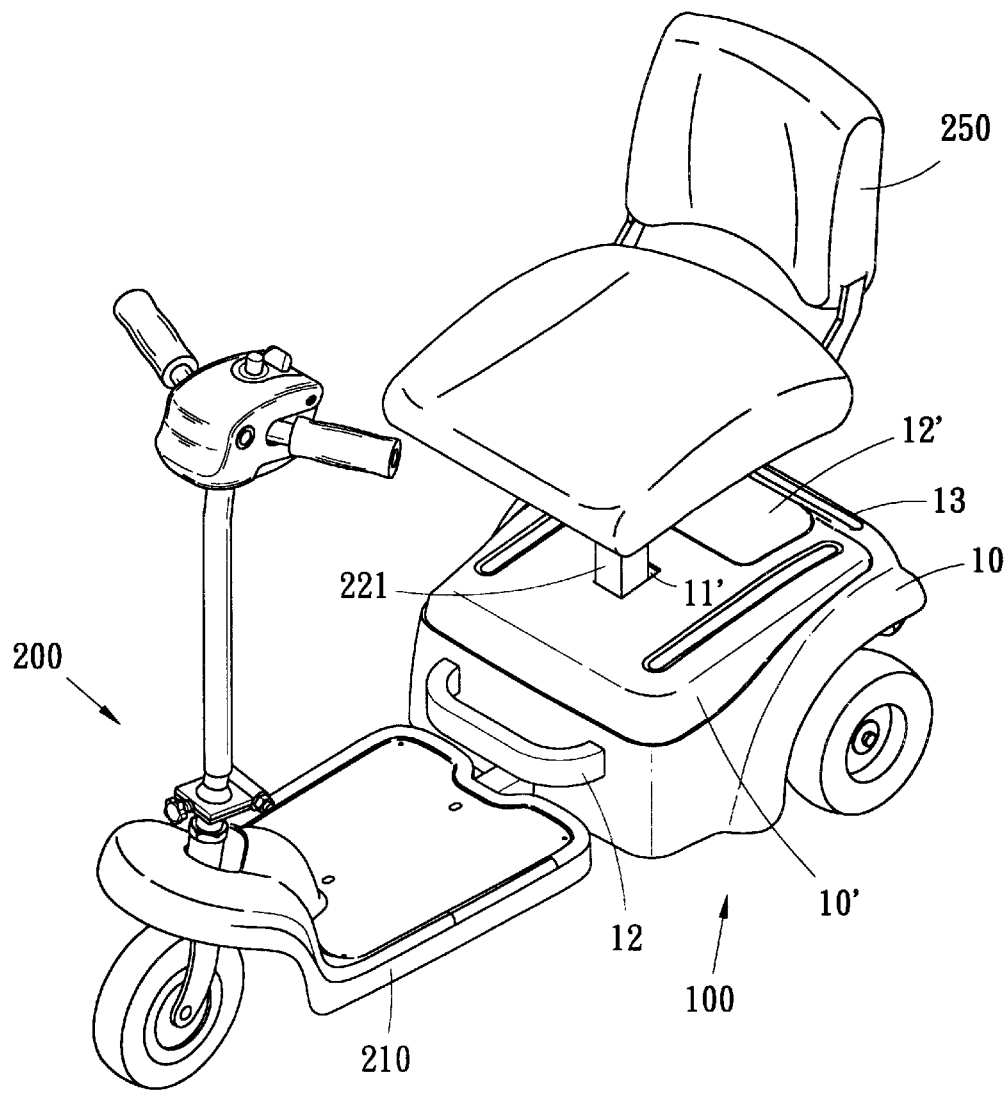
FIG. 1 is an assembled perspective view of a medical scooter having a battery housing of the present invention mounted thereon.

Please refer to FIGS. 1 through 5 in which a battery housing for a medical scooter according to the present invention is shown. For the purpose of simplicity, the battery housing for the medical scooter of the present invention will be referred to as "the battery housing" and denoted with a reference numeral "100", and a body of the medical scooter will be denoted with a reference numeral "200" hereinafter. In the illustrated medical scooter, it includes a body 200 having front and rear parts detachably connected to each other. However, it is to be noted the battery housing 100 of the present invention is also applicable to a medical scooter having integrally connected front and rear parts.

The body 200 of the medical scooter includes a front part 210 and a rear part 220 that are detachably connected to each other by means of a connecting bolt 230 and a clearance-adjusting bolt 240, so that the front and the rear parts 210, 220 of the body 200 may be separated from or assembled to each other. The rear part 220 is provided with a seat post sleeve 221 for receiving a bottom post of a seat 250 therein. The seat 250 could be adjusted in a height relative to the sleeve 221 by means of a height-adjusting bolt 222. Two recesses 260 having a plurality of drain holes 261 provided at a bottom thereof are provided at two sides of the rear part 220 of the body 200 at predetermined positions, so that any water accumulated on the rear part 220 could flow into the recesses 260 and be drained via the drain holes 261, as can be more clearly seen in FIG. 5.

The battery housing 100 mainly includes a movable base 10 and two elastic conductive plates 30. The movable base 10 could be of any shape. In the illustrated drawings, the movable base 10 has a configuration corresponding to that of the rear part 220 of the body 200.

The movable base 10 includes a sleeve passage 11 via which the seat post sleeve 221 extends upward to engage with the post of the seat 250;

two handles 12, 13 separately connected to front and rear ends of the movable base 10 to facilitate convenient lifting or lowering of the movable base 10 relative to the sleeve 221; at least two isolated battery compartments 14 for each receiving a battery 20 therein; an electrode contact 15 provided at a bottom of each battery compartment 14 (see FIG. 3); and an electricity chamber 17 for accommodating a charger 18 and a length of power cord 19 connected to the charger 18.

Figure 3:
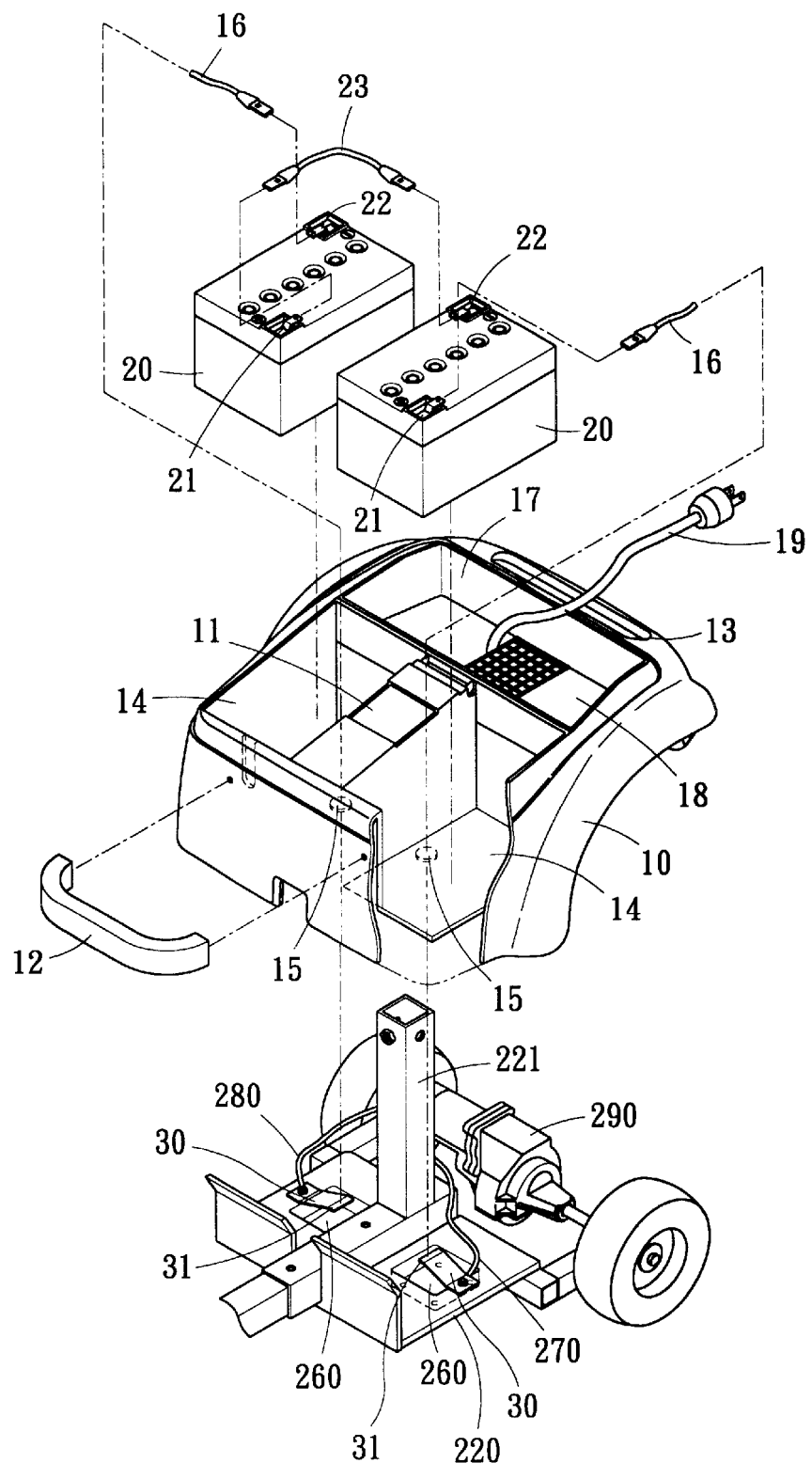
FIG. 3 is an exploded perspective view showing the connection of two elastic conductive plates to positive and negative electrodes of batteries received in the battery housing of the present invention.
Figure 5:
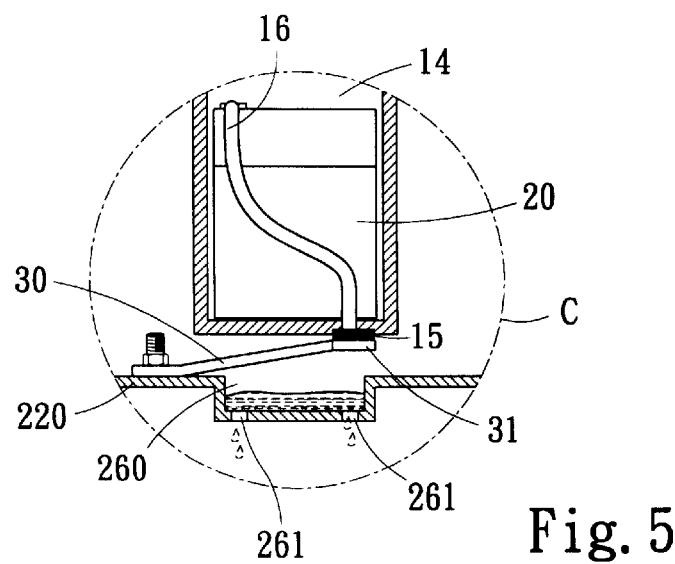
FIG. 5 is an enlarged sectional view of the encircled area C in FIG. 4 showing the connection of the elastic conductive plate to an electrode contact on the battery housing of the present invention.

A first conductor 16 is connected at an end to the electrode contact 15 in one of the two battery compartments 14 and at another end to a positive electrode 21 of the battery 20 received in the same battery compartment 14, and a second conductor 16 is connected at an end to the electrode contact 15 in another battery compartment 14 and at another end to a negative electrode 22 of the battery 20 received in the same battery compartment 14, as shown in FIGS. 3 and 5. Cables 23 are used to connect the positive electrode 21 and the negative electrode 22 separately provided on two batteries 20, so that the batteries 20 are serially or parallelly connected. In the illustrated drawings, the batteries 20 are serially connected.

Figure 8:
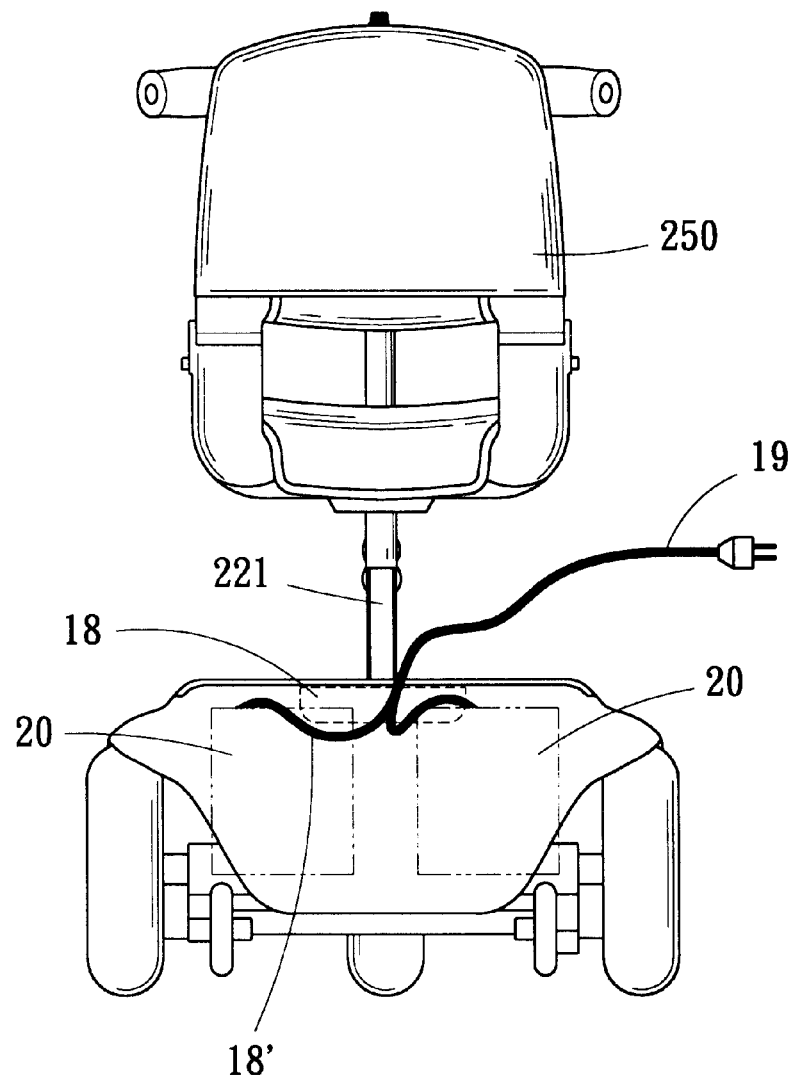
FIG. 8 is a rear view of the medical scooter of FIG. 1 showing the power cord pulled out of the electricity chamber is connected to an AC power source to recharge batteries through a charger.
Figure 9:
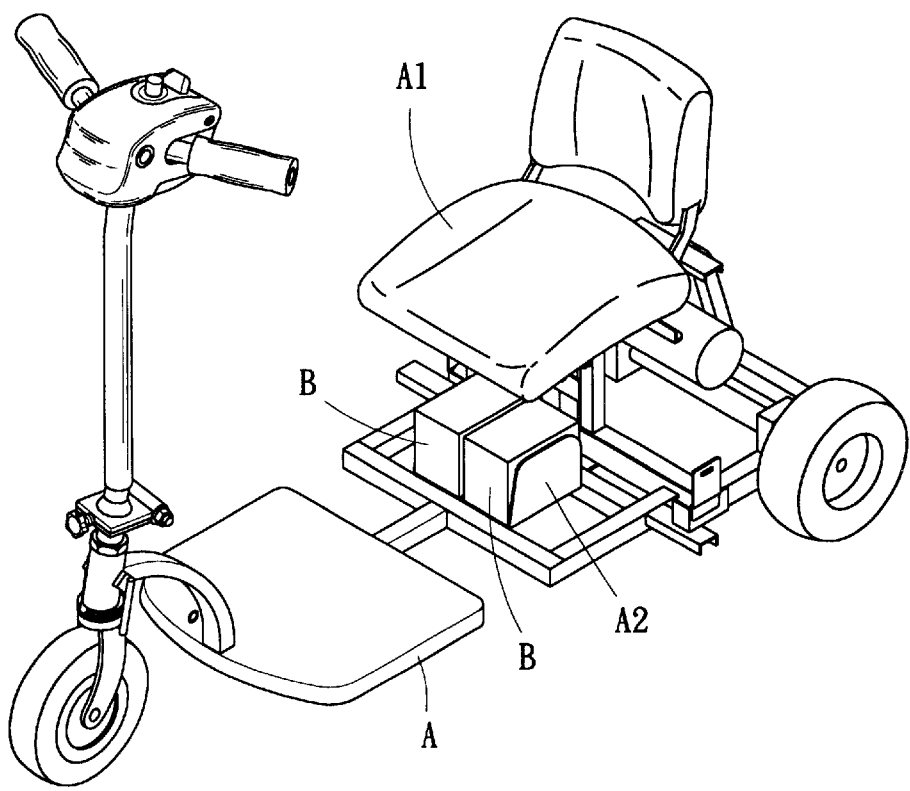
FIG. 9 is a schematic view showing the conventional manner of mounting batteries on an electric cart.

The charger 18 is connected to the batteries 20 by means of a cable 18', as shown in FIG. 8, so as to recharge the batteries 20. The power cord 19 may be pulled out of the electricity chamber 17 to connect the charger 18 to an external AC power source.

The battery housing 100 of the present invention further includes an upper cover 10' openably closed onto a top of the movable base 10. The upper cover 10' includes a sleeve passage 11' via which the seat post sleeve 221 upward extends to engage with the post of the seat 250; an electricity chamber lid 12' corresponding to the electricity chamber 17 of the movable base 10 for closing or opening the electricity chamber 17.

Figure 2:
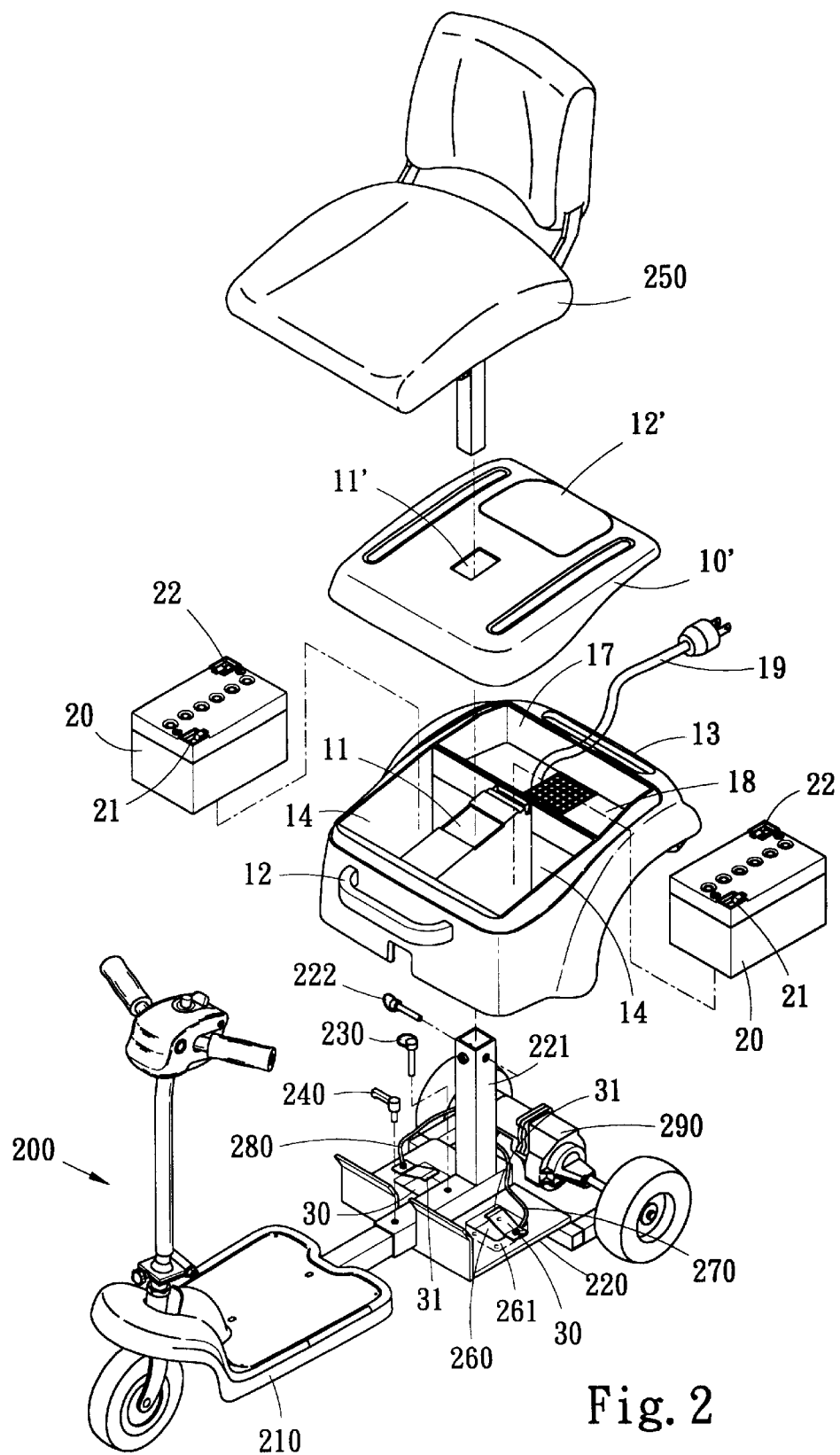
FIG. 2 is an exploded perspective view of FIG. 1.
Figure 4:
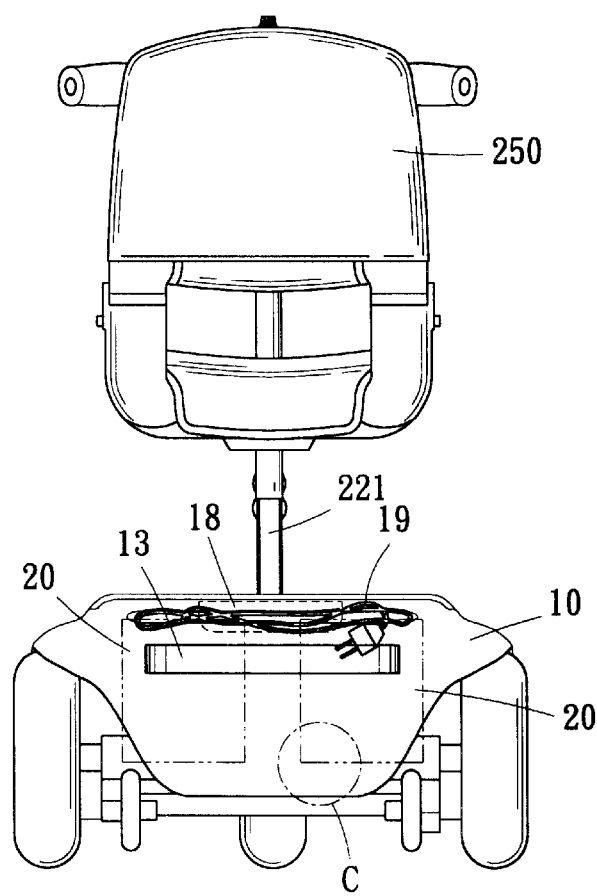
FIG. 4 is a rear plan view of the medical scooter of FIG. 1.

The two elastic conductive plates 30 are separately screwed at one end to two sides of the rear part 220 of the body 200 to locate above the two draining recesses 260 and below the two battery compartments 14, as can be seen in FIGS. 2, 3 and 5. The elastic conductive plates 30 may be of any shape. A first embodiment of the elastic conductive plate 30 illustrated in FIG. 4 is a metal strip having an upward extended free end to provide a certain degree of elasticity to move up and down. A contact 31 is provided at the upward extended free end of each conductive plate 30 to upward correspond to the electrode contact 15 provided at the bottom of each battery compartment 14 on the movable base 10, so that two contacts 31 are separately electrically connect to the positive electrode 21 and the negative electrode 22 of the two batteries 20. The ends of the two elastic conductive plates 30 being screwed to the rear part 220 of the body 200 are separately connected to a positive power supply wire 270 and a negative power supply wire 280. Power is supplied from the batteries 20 to the positive and the negative power supply wires 270, 280 via the contacts 31 of the elastic conductive plates 30 for providing a working power needed by a driving motor 290 and other electric loads to move the body 200 of the medical scooter.

Figure 6:
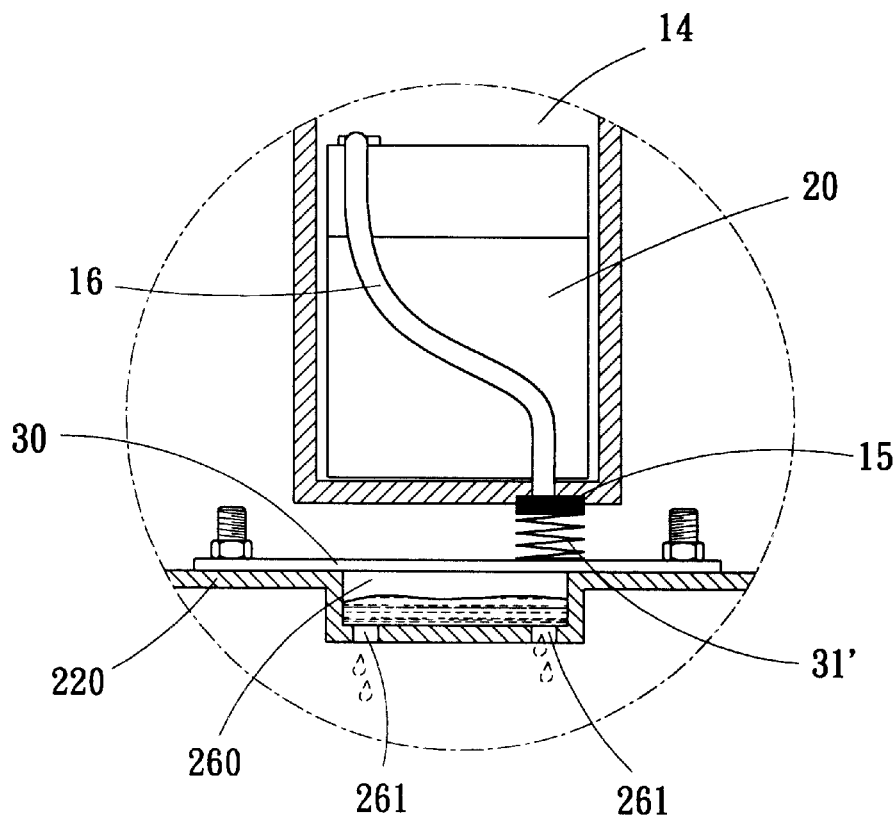
FIG. 6 is a fragmentary and enlarged view showing another form of the elastic conductive plate and the connection of it to the electrode contact.

Please refer to FIG. 6 that is similar to FIG. 5 but shows a second embodiment of the elastic conductive plate 30. The elastic conductive plate 30 in this second embodiment is extended across the draining recess 260 and has a contact 31' in the form of a coil spring. The contact 31' provides good elastic compressibility to normally upward press against the electrode contact 15 at the bottom of the battery compartment 14, so that current could be supplied from the batteries 20 via the contacts 31' and the conductive plates 30 to the positive power supply wire 270 and the negative power supply wire 280, just as in the case of the first embodiment shown in FIG. 5.

Figure 7:
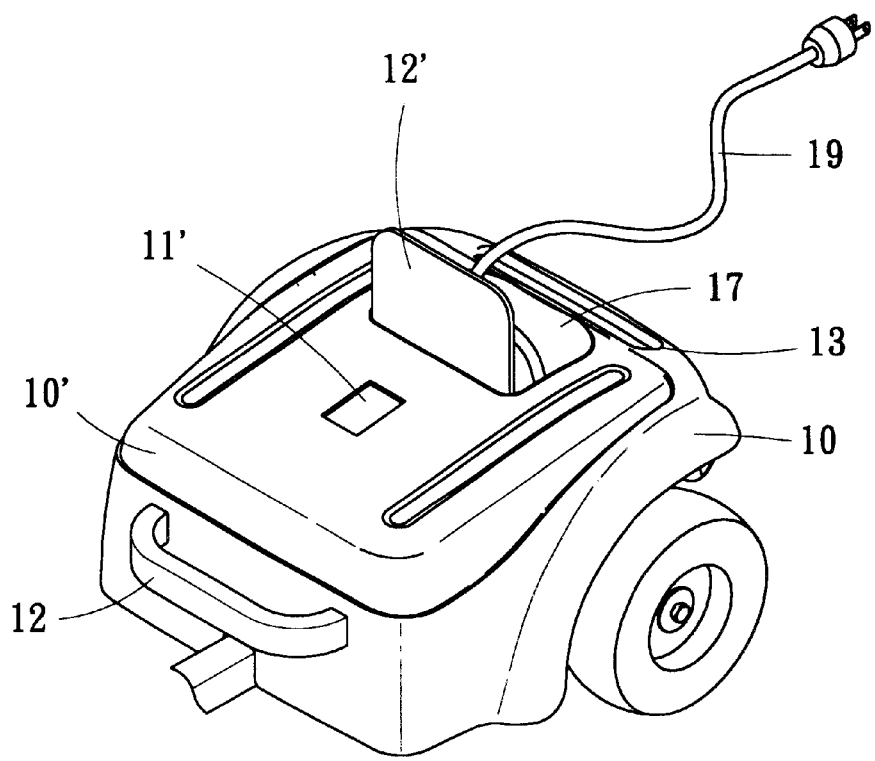
FIG. 7 is a fragmentary perspective view of the battery housing of the present invention showing a lid on an upper cover thereof is lifted for conveniently pulling out a power cord from an electricity chamber of the battery housing.

FIGS. 7 and 8 show the electricity chamber lid 12' of the upper cover 10' of the battery housing 100 is lifted and the power cord 19 is pulled out of the electricity chamber 17 to connect to an external AC power source, so that the charger 18 obtains necessary working power to recharge the batteries 20. That is, the batteries 20 could be automatically recharged simply by pulling the power cord 19 out of the movable base 10 of the battery housing 100 to connect to an external AC power source without the need of consuming too much time and labor to dismount the batteries 20 from the medical scooter.

The following are some advantages of the battery housing 100 of the present invention:

1. The batteries 20 in the movable base 10 of the battery housing 100 could be easily dismounted and re-mounted without consuming too much time and labor. An operator needs only to grip at the handles 12, 13 of the movable base 10 to detach the same from the seat post sleeve 221. Thus, the batteries 20 and the charger 18 could be more conveniently dismounted or mounted for maintenance and replacement purpose.
2. The isolated battery compartments 14 and the upper cover 10' provide the battery housing 100 with better watertight and moisture-resistant ability to protect the batteries 20 from water and moisture, ensuring good performance and prolonged life of the batteries 20.
3. It is possible for the two elastic conductive plates 30 to simultaneously contact with or separate from the two isolated electrode contacts 15, so that wires connected to the positive and the negative electrodes would not unexpectedly and dangerously contact with each other when the batteries 20 are dismounted or re-mounted. The batteries 20 could therefore be handled in a safer manner.

4. The provision of recesses 260 and drain holes 261 in the recesses 260 enables draining of water accumulated around the positive power supply wire 270, the negative power supply wire 280, and the elastic conductive plates 30 to protect such elements from damages caused by accumulated water and any acid corrosion and accordingly from increased resistance or short circuit or open circuit in the wiring of the medical scooter.

5. The batteries 20 could be easily recharged with the charger 18 simply by lifting the electricity chamber lid 12' of the upper cover 10' and pulling out the power cord 19 to connect it to an external AC power source. An operator need not to repeatedly dismount and re-mount any shell or the batteries 20 of the medical scooter.

The battery housing for medical scooter as illustrated in FIGS. 1 through 8 is characterized in its simple, integral and dismountable structure that enables dismounting, re-mounting, and recharging of the batteries of the medical scooter at reduced time and labor, and protects the batteries and related components and wirings from water and moisture to ensure safe operation thereof.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A battery housing for medical scooter being detachably mounted onto a rear part of said medical scooter, comprising:
   a movable base being provided with a sleeve passage via which a seat post sleeve on said rear part of said medical scooter upward extends to receive a bottom post of a seat of said medical scooter, at least two isolated battery compartments to separately receive a battery therein, and an electrode contact located at a bottom of each said battery compartment for electrically connecting to a positive or a negative electrode of a battery received in said battery compartment; and
   two elastic conductive plates being separately screwed at an end to two sides of said rear part of said medical scooter to separately connect a positive and a negative power supply wire of said medical scooter, so that another end of each said conductive plate normally elastically contacts with said electrode contact provided at the bottom of each said battery compartment, allowing power to be supplied from said batteries via said electrode contacts and said elastic conductive plates to said positive and said negative power supply wires;
   wherein said movable base is upward and downward movable along said seat post sleeve for said electrode contacts at the bottom of said isolated battery compartments to separate from or contact with said two elastic conductive plates on said rear part of said medical scooter, so that positive and negative electrodes of said batteries could be simultaneously disconnected from or connected to said positive and said negative power supply wires.

2. The battery housing for medical scooter as claimed in claim 1, wherein said movable base includes an electricity chamber for accommodating a charger and a length of power cord thereof, and said power cord being adapted to connect to an external AC power source for said charger to recharge said batteries.

3. The battery housing for medical scooter as claimed in claim 2, further comprises an upper cover removably closed on a top of said movable base, said upper cover being provided with a sleeve passage corresponding to said sleeve passage on said movable base for said seat post sleeve to upward extend therethrough to engage with said bottom post of said seat, and an electricity chamber lid for openably closing said electricity chamber of said movable base.

4. The battery housing for medical scooter as claimed in claim 1, wherein said movable base is provided at two ends with two handles to facilitate easy lifting or lowering of said movable base relative to said rear part of said medical scooter.

5. The battery housing for medical scooter as claimed in claim 2, wherein said movable base is provided at two ends with two handles to facilitate easy lifting or lowering of said movable base relative to said rear part of said medical scooter.

6. The battery housing for medical scooter as claimed in claim 1,
   wherein said batteries in said battery compartments of said movable base could be serially or parallelly connected to each other.

7. The battery housing for medical scooter as claimed in claim 1, wherein each said battery in said battery compartment of said movable base is electrically connected at a positive or a negative electrode thereof to said electrode contact of the same said battery compartment via a conductor.

8. The battery housing for medical scooter as claimed in claim 1, wherein said another end of each said elastic conductive plate extends upward to provide a certain degree of vertically elastic compressibility and is provided with a contact that is normally in contact with said electrode contact at the bottom of said battery compartment of said movable base.

9. The battery housing for medical scooter as claimed in claim 1, wherein said another end of each said elastic conductive plate is provided with a contact in the form of a coil spring to normally contact with said electrode contact at the bottom of said battery compartment of said movable base.

10. The battery housing for medical scooter as claimed in claim 1, wherein said rear part of said medical scooter is provided below said elastic conductive plates with two recesses for collecting water accumulated around said elastic conductive plates.

11. The battery housing for medical scooter as claimed in claim 10,
    wherein said recesses are provided with drain holes to drain water collected therein.

* * * * *